United States Patent
Ishimaru et al.

(10) Patent No.: US 10,043,106 B2
(45) Date of Patent: Aug. 7, 2018

(54) CORRESPONDING POINT SEARCHING METHOD AND DISTANCE DETECTION DEVICE

(71) Applicants: DENSO CORPORATION, Kariya, Aichi-pref. (JP); TOYOTA SCHOOL FOUNDATION, Nagoya-shi, Aichi-ken (JP)

(72) Inventors: Kazuhisa Ishimaru, Nishio (JP); Noriaki Shirai, Kariya (JP); Hossein Tehrani Niknejad, Kariya (JP); Seiichi Mita, Nagoya (JP); Qiwei Xie, Nagoya (JP); Qian Long, Nagoya (JP)

(73) Assignees: DENSO CORPORATION, Kariya, Aichi-pref. (JP); TOYOTA SCHOOL FOUNDATION, Nagoya-shi, Aichi-ken (JP)

(*) Notice: Subject to any disclaimer, the term of this patent is extended or adjusted under 35 U.S.C. 154(b) by 46 days.

(21) Appl. No.: 15/171,606

(22) Filed: Jun. 2, 2016

(65) Prior Publication Data
US 2016/0358325 A1 Dec. 8, 2016

(30) Foreign Application Priority Data
Jun. 4, 2015 (JP) .................. 2015-114134

(51) Int. Cl.
*G06K 9/00* (2006.01)
*G06K 9/62* (2006.01)
(Continued)

(52) U.S. Cl.
CPC ......... *G06K 9/6215* (2013.01); *G06K 9/4604* (2013.01); *G06K 9/6202* (2013.01); *G06T 7/593* (2017.01); *G06T 2207/20016* (2013.01)

(58) Field of Classification Search
None
See application file for complete search history.

(56) References Cited

U.S. PATENT DOCUMENTS

| 5,768,404 A | 6/1998 | Morimura et al. |
| 6,215,899 B1 | 4/2001 | Morimura et al. |

(Continued)

FOREIGN PATENT DOCUMENTS

| JP | H09-027969 A | 1/1997 |
| JP | 2003-085566 | 9/2001 |

(Continued)

OTHER PUBLICATIONS

JP 2009199575 computer generated translation Sep. 2009; Sugano Junichi.*

(Continued)

*Primary Examiner* — Nancy Bitar
(74) *Attorney, Agent, or Firm* — Knobbe, Martens, Olson & Bear, LLP

(57) ABSTRACT

A corresponding point searching method searches corresponding points in plural images, acquired by in-vehicle cameras, for each pixel in a reference image by using a predetermined first method, for example, the Viterbi algorithm. The method searches corresponding points in the plural images for each pixel in the reference image by using a predetermined second method, for example, an optical flow method. The method detects whether or not a search accuracy of the corresponding points in each region divided in the reference image obtained by the predetermined first method is not less than a reference value. When not less than the reference value, the method selects the corresponding points obtained by the predetermined first method. When less than the reference value, the searching method selects the corresponding points obtained by the predetermined second method. The searching method provides the corre- (Continued)

sponding points between the plural images with a high accuracy.

6 Claims, 11 Drawing Sheets

(51) Int. Cl.
*G06K 9/46* (2006.01)
*G06T 7/593* (2017.01)

(56) References Cited

U.S. PATENT DOCUMENTS

| | | | | |
|---|---|---|---|---|
| 2002/0038294 | A1* | 3/2002 | Matsugu | G06K 9/00973 706/20 |
| 2008/0013836 | A1* | 1/2008 | Nakamura | G06K 9/4642 382/209 |
| 2009/0010530 | A1* | 1/2009 | Sumitomo | G06T 7/593 382/154 |
| 2013/0336540 | A1* | 12/2013 | Zhang | G06T 7/40 382/108 |
| 2014/0147049 | A1* | 5/2014 | Sumitomo | G06K 9/36 382/190 |

FOREIGN PATENT DOCUMENTS

| | | |
|---|---|---|
| JP | 2003-008556 A | 1/2003 |
| JP | 2015-114269 A | 6/2015 |

OTHER PUBLICATIONS

"Particle Video: Long-Range Motion Estimation using Point Trajectories" by Peter Sand and Seth Teller; MIT Computer Science and Artificial Intelligence Laboratory.
"Secrets of Optical Flow Estimation and Their Principles" by Deqing Sun et al.
"Image Guided Depth Upsampling using Anisotropic Total Generalized Variation" by David Ferstl et al.; Graz University of Technology.
"An Improved Algorithm for TV-L1 Optical Flow" by A. Wedel et al.; Proc. of the Dagstuhl Motion Workshop, 2008.
U.S. Appl. No. 14/947,941 and its entire file history filed Nov. 20, 2015, Ishimaru et al.

* cited by examiner

FIG.3A ORIGINAL IMAGE

FIG.3B STRUCTURE PART IMAGE

FIG.3C TEXTURE PART IMAGE

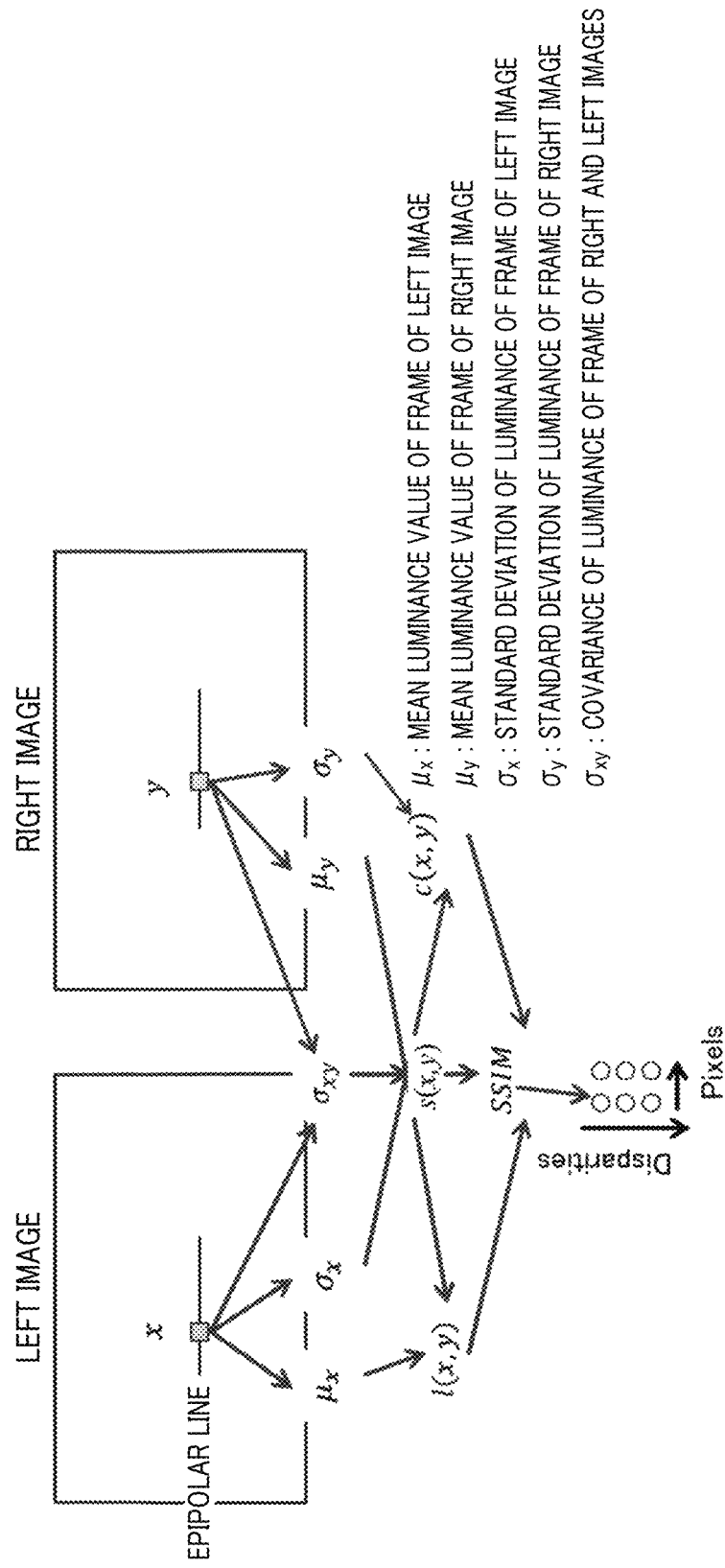

NODE
REFERENCE IMAGE: XY DIRECTION [pixel]
PARALLAX [PIXEL]
UPWARD RIGHT BY +1

PARALLAX [pixel]
X DIRECTION [pixel] (RIGHT AND LEFT DIRECTIONS)
Y DIRECTION [pixel] (UPWARD AND DOWNWARD)

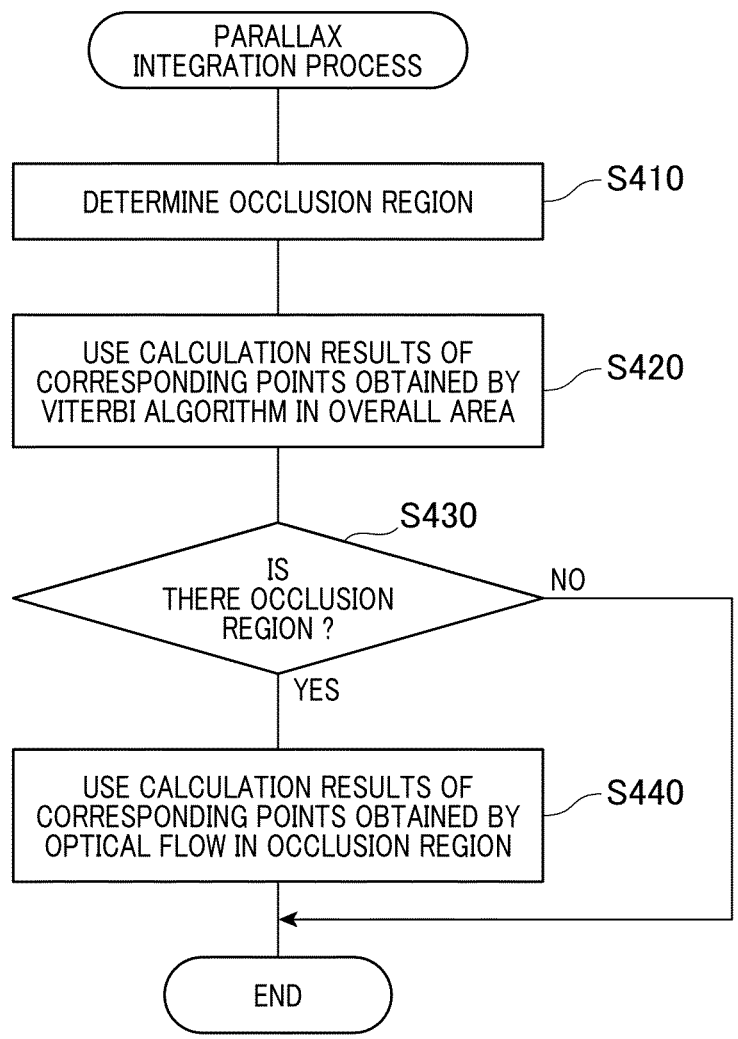

_US 10,043,106 B2_

CORRESPONDING POINT SEARCHING METHOD AND DISTANCE DETECTION DEVICE

CROSS-REFERENCE TO RELATED APPLICATION

This application is related to and claims priority from Japanese Patent Application No. 2015-114134 filed on Jun. 4, 2015, the contents of which are hereby incorporated by reference.

BACKGROUND OF THE INVENTION

1. Field of the invention

The present invention relates to corresponding point searching methods capable of searching for corresponding points between images acquired by cameras, and further relates to distance detection devices performing the corresponding point searching method.

2. Description of the Related Art

For example, a patent document 1 as a conventional technique, Japanese patent laid open 2003-085566 has disclosed a conventional searching method on the basis of the Viterbi algorithm capable of searching for corresponding points between right side image and left side image captured by in-vehicle cameras.

The conventional searching method capable of searching or finding for correct corresponding points often searches incorrect corresponding points with unpredictable search accuracy due to the types of captured images.

SUMMARY

It is therefore desired to provide a corresponding point searching method capable of searching for corresponding points between images with a high search accuracy regardless of the types of captured images. Further, the present invention provides a distance detecting device capable of performing the corresponding point searching method for detecting a distance to an object in images captured by in-vehicle cameras on the basis of a parallax between the captured images.

An exemplary embodiment provides a corresponding point searching method capable of searching for corresponding points between plural images acquired by in-vehicle cameras mounted on a vehicle. Another exemplary embodiment provides an image processing device capable of performing the corresponding point searching method. That is, the image processing device performs image processing of plural images having parallax therebetween. The corresponding point searching method performs a first searching step, a second searching step, a search accuracy judgment step, and a corresponding point setting step. The first searching step performs a predetermined first method for searching or finding for corresponding points between the plural images for each pixel in a reference image in the plural images. The second searching step performs a predetermined second method for searching or finding for the corresponding points between the plural images for each pixel in the reference image in the plural images. The predetermined second method is different from the predetermined first method. The search accuracy judgment step detects whether or not search accuracy of corresponding points obtained by the predetermined first method is not less than a reference value. The corresponding point setting step selects the corresponding points obtained by the predetermined first method when the search accuracy of the corresponding points obtained by the predetermined first method is not less than the reference value. The corresponding point setting step selects the corresponding points obtained by the predetermined second method when the search accuracy of corresponding points obtained by the predetermined first method is less than the reference value.

Because the corresponding point searching method uses the predetermined second method when the search accuracy of corresponding points between images obtained by the predetermined first method is a low, it is possible to provide the corresponding points between captured images with high search accuracy.

BRIEF DESCRIPTION OF THE DRAWINGS

A preferred, non-limiting embodiment of the present invention will be described by way of example with reference to the accompanying drawings, in which:

FIG. 6 is a view schematically explaining a SSIM (structural similarity);

FIG. 10 is a flow chart showing a parallax integration process in the distance calculation process shown in FIG. 2.

DETAILED DESCRIPTION OF THE PREFERRED EMBODIMENTS

Hereinafter, various embodiments of the present invention will be described with reference to the accompanying drawings. In the following description of the various

Exemplary Embodiment

A description will be given of a corresponding point searching method and a distance detection device 1 according to an exemplary embodiment with reference to FIG. 1 to FIG. 11C.

(Structure)

Figure 1:
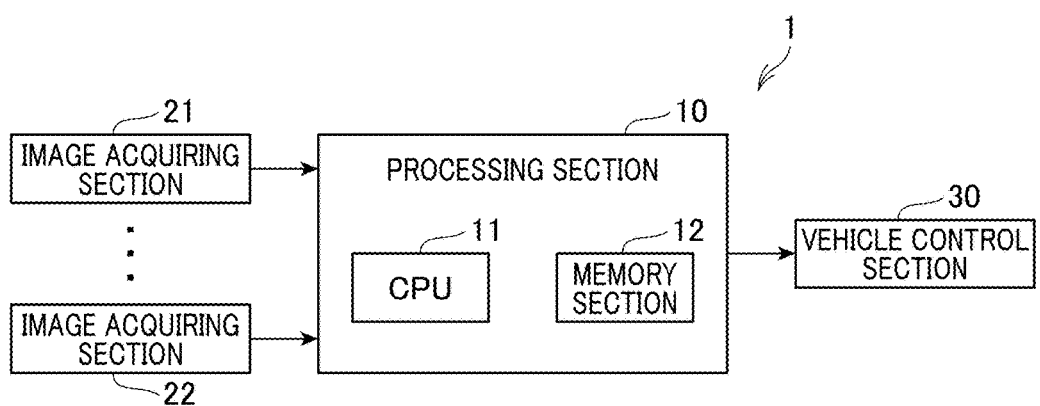
FIG. 1 is a view showing a block diagram of a schematic structure of a distance detection device 1 according to an exemplary embodiment of the present invention.

FIG. 1 is a view showing a block diagram of a schematic structure of the distance detection device 1 according to the exemplary embodiment. The concept of the present invention is applied to the distance detection device 1 shown in FIG. 1.

The distance detection device 1 shown in FIG. 1 performs a distance detection method. The distance detection device 1 detects a parallax of images acquired by image acquiring sections 21 and 22 such as in-vehicle cameras, and detects each point (each object) in the images on the basis of the detected parallax between the images. In particular, the distance detection device 1 according to the exemplary embodiment can obtain a corresponding relation (parallax) between pixels in the acquired images on the Viterbi algorithm and the optical flow with high accuracy and low processing load because of applying the Viterbi algorithm to pixels in the acquired images in a plurality of directions. The distance detection device 1 according to the exemplary embodiment can detect a distance to an object in the acquired imaged on the basis of using both the Viterbi algorithm and the optical flow.

In more detail, as shown in FIG. 1, the distance detection device 1 according to the exemplary embodiment has the processing section 10, the two image acquiring sections 21 and 22, and a vehicle processing section 30. It is also acceptable for the distance detection device 1 to have three or more image acquiring sections.

The image acquiring sections 21 and 22 are in-vehicle cameras, which are well known, mounted on a vehicle. Each of these image acquiring sections 21 and 22 acquires a front scene within an acquiring range in front of the vehicle. The image acquiring sections 21 and 22 are arranged to be parallel in a horizontal direction, and separated from each other by a predetermined interval. The image acquiring sections 21 and 22 form a stereo camera system. It is so designed for the image acquiring sections 21 and 22 to periodically acquire front images simultaneously at predetermined time intervals.

The processing section 10 is a microcomputer which has a central processing unit 11 (CPU 11), a memory section 12 such as a read only memory (ROM), a random access memory (RAM), etc. The processing section 10 receives the acquired images transmitted from the image acquiring sections 21 and 22. The processing section 10 performs various processes such as a distance detection process on the basis of the programs stored in the memory section 12.

The vehicle processing section 30 performs a vehicle control process on the basis of processing results obtained by the processing section 10. For example, the vehicle processing section 30 receives distance information regarding a distance of each point (each pixel) in the captured images within the image acquiring range of the image acquiring sections 21 and 22. After receiving the distance information, the processing section 10 detects a position of an object and a relative speed between the own vehicle and the object on the basis of the information regarding a distance of each point in the acquired images. When detecting abnormality in safe driving of the object on the basis of the received detection results, the vehicle processing section 30 changes the driving lane of the own vehicle.

[The Process Performed by the Distance Detection Device 1 According to the Exemplary Embodiment]

Figure 2:
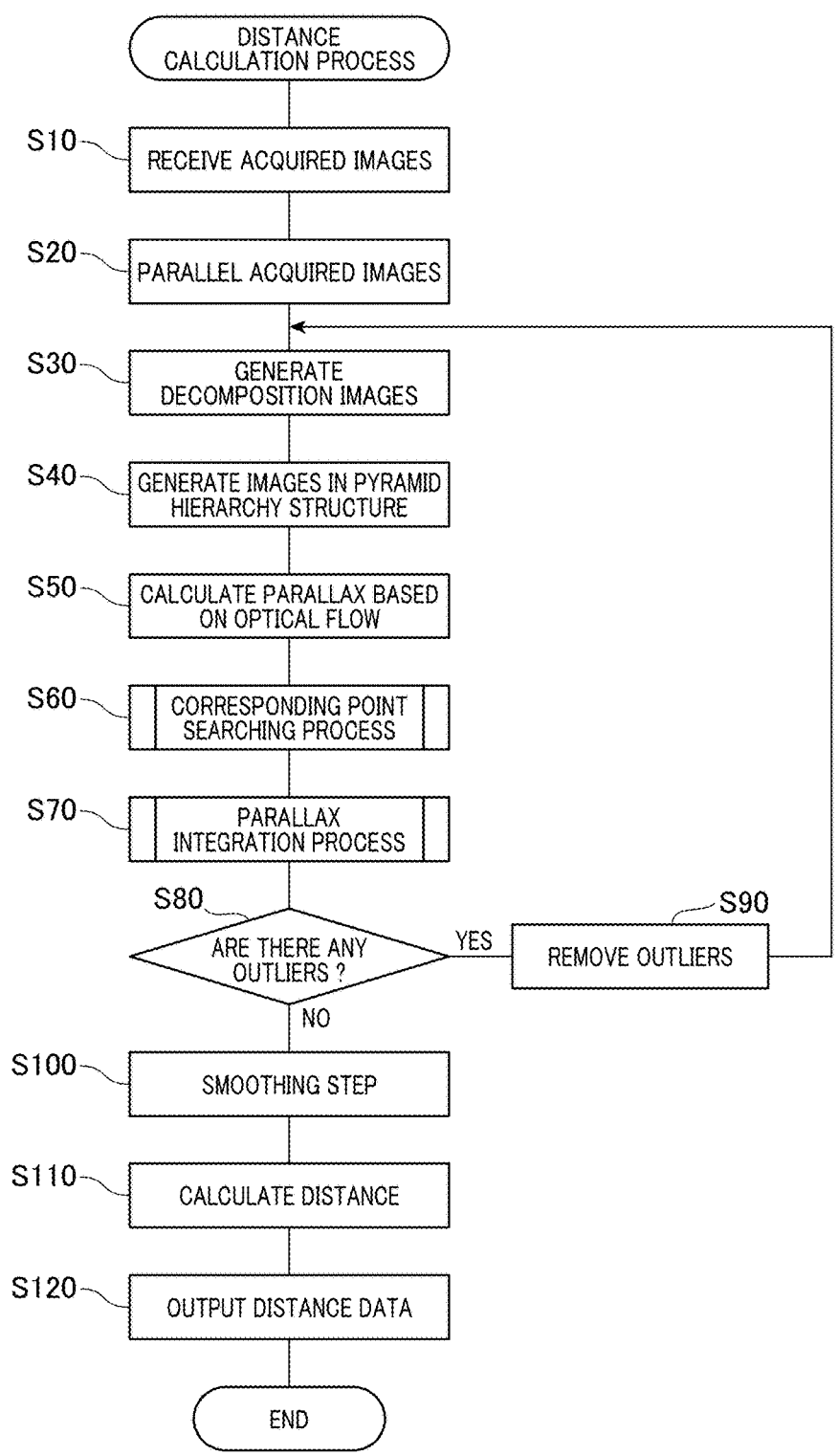
FIG. 2 is a view showing a flow chart of a distance calculation method performed by a processing section 10 having a central processing unit 11 in the distance detection device 1 according to the exemplary embodiment shown in FIG. 1.
Figure 3:
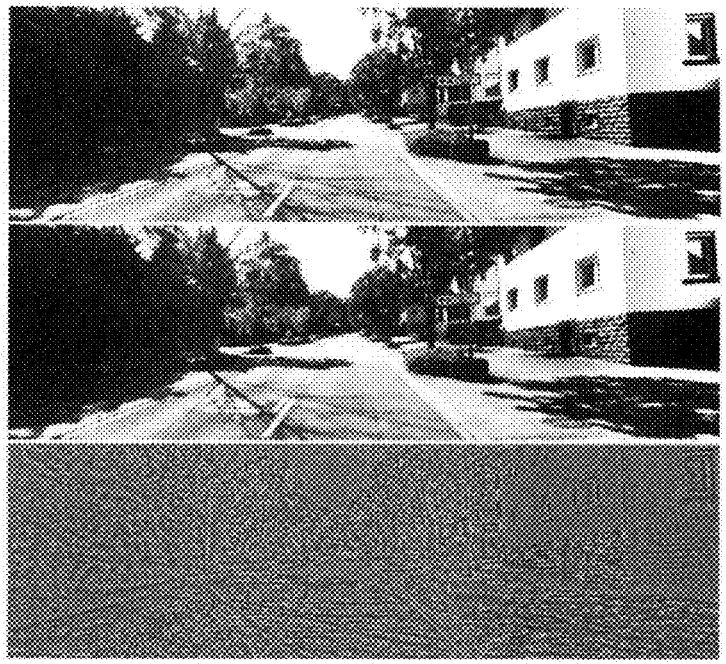
FIG. 3A to FIG. 3C are views showing an original image, a structural part image and a texture part image, respectively, obtained by the distance calculation method shown in FIG. 2.

In the distance detection device 1 according to the exemplary embodiment having the structure previously described, the CPU 11 in the processing section 10 shown in FIG. 1 performs the distance calculation process. FIG. 2 is a view showing the flow chart of the distance calculation process (or the distance calculation method) performed by the CPU 11 in the processing section 10 in the distance detection device 1 according to the exemplary embodiment.

The distance calculation process calculates a distance to each point in the captured image. For example, the CPU 11 starts to execute the distance calculation process shown in FIG. 2 when a power source of the distance detection device 1 is turned on. After the power source is turned on, the CPU 11 repeatedly performs the distance calculation process at predetermined time intervals.

In step S10 of the distance calculation process, the CPU 11 receives the acquired images captured by and transmitted from the image acquiring sections 21 and 22. The operation flow progresses to step S20.

In step S20, the CPU 11 performs a paralleling process for the acquired images. That is, the paralleling process compensates a distortion of the acquired images and a shift between the acquired images caused by the characteristics of the lenses of the image acquiring sections 21 and 22. The operation flow progresses to step S30.

FIG. 3A to FIG. 3C are views showing an example of decomposition images obtained by the distance calculation process shown in FIG. 2. That is, FIG. 3A shows an original image, i.e. the acquired original image transmitted from the image acquiring sections 21 and 22 mounted on the own vehicle. FIG. 3B shows a structural part image obtained from the acquired original image, i.e. the acquired image shown in FIG. 3A. FIG. 3C shows a texture part image obtained from the acquired original image shown in FIG. 3A.

In step S30, the CPU 11 in the processing section 10 generates decomposition images. The decomposition images include the structural part image (see FIG. 3B) and the texture part image (see FIG. 3C). In more detail, the structural part image shows a rough outline or contour and a geometric structure extracted from the acquired original image shown in FIG. 3A. FIG. 3B shows the structural part image extracted from the acquired original image. Further, the texture part image (see FIG. 3C) shows a fine pattern on a surface of each object contained in the acquired original image. The texture part image shows a fine pattern when compared with the structural part image.

The structural part image can be obtained by using the following equation (1) which performs a minimization process:

$$\min_{I_s} \int_\Omega \left\{ |\nabla I_s| + \frac{1}{2\theta}(I_s - I)^2 \right\} dx. \tag{1}$$

where I indicates an acquired image (acquired original image), and Is indicates a structural part image.

In the equation (1), $\nabla I_s$ is a term to be used for reducing, as low as possible, a partial differentiation of luminance in the structural part image. Edge parts are left in the image by using the term ∇Is. In the equation (1), the term of ½θ $(Is-I)^2$ is used to reduce a luminance difference between the structural part image and the acquired original image. The presence of the term of ½θ $(Is-I)^2$ prevents the luminance difference between the structural part image and the acquired image to increase.

In order to obtain the texture part image (see FIG. 3C), the CPU 11 in the processing section 10 calculates It=I−Is, where It indicates the texture part image. The CPU 11 stores the calculation results, i.e. the structural part image and the texture part image into the memory section 12. The operation flow progresses to step S40.

In step S40, the CPU 11 in the processing section 10 generates images with a pyramid hierarchical structure. The images with a pyramid hierarchical structure are generated on the basis of the single acquired image and show a plurality of images with a different resolution. For example, the CPU 11 generates the three types of images with enlargement ratios of 1, ½ and ¼, respectively from the acquired original image. The CPU 11 stores the generated images with a pyramid hierarchical structure into the memory section 12. Each of the images with a pyramid hierarchical structure has an enlargement ratio η of 1, ½ and ¼.

The CPU 11 performs the following process in order from images with a low resolution (i.e. with a small enlargement ratio η) stored in the memory section 12. It is acceptable to generate the images with a pyramid hierarchical structure from the acquired original image only, or from each of the decomposition images. The operation flow progresses to step S50.

In step S50, the CPU 11 performs the parallax calculation by using the optical flow. In the parallax calculation using the optical flow, the CPU 11 uses, as the following equation (2), the optical flow equation (which has been disclosed in the following technical document).

"An improved algorithm for tv—L1 optical flow", Wedel, T. Pock, C. Zach, D. Cremers, and H. Bischof, Proc. of the Dagstuhl Motion Workshop, the second paragraph on 2008.

$$K(u) = \min_u \{\rho \cdot \phi(\theta(u)) + \lambda \varphi(u, \nabla u)\} \quad (2)$$

u: disparity map

In the equation (2), the first term in the braces indicates a data term (matching cost) which represents luminance and contrast in the image. The CPU 11 use the data terms to calculate a difference between right image and left image on the basis of observed luminance information. In the equation (2), the latter term in the curly bracket indicates a regularization term to be used for performing a smoothing process. The regularization term is used to suppress a change of ∇u and ∇v from increasing when these ∇u, ∇v are large, and estimate a solution of robust such as noises. The CPU 11 uses Lp norm which has been proposed in the Total Generalized Variation (For example, see http://www.uni-graz.at/imawww/optcon/projects/bredies/tgv.html) In particular, the CPU 11 sets the $L_P$ norm to a value which is larger than zero and less than 1 to the Lp norm. This makes it possible to obtain a robust with sharp outlines or contour to noise.

The data term (matching cost) can be expressed by the following equation (3) which uses the Census transform (C) and Structural similarity (SSIM) as matching feature values.

$$\phi(\theta(u)) = \|C(x+u_0, y) + C^x(x+u_0, y) \cdot (u-u_0) - C(x,y)\|_1 + \|SS(x+u_0, y) + SS^x(x+u_0, y) \cdot (u-u_0) - SS(x,y)\|_1 \quad (3)$$

In the equation (3), the feature values are fixed values. On the other hand, the regularization term can be expressed by the following equation (4).

$$\varphi(u, \nabla u) = \min_v \alpha_1 \int |T^{1/2}(\nabla u - v)| + \alpha_2 \int |\nabla u| \quad (4)$$

$$T^{1/2} = \exp(-\beta |\nabla I_i^s|^\gamma) nn^T + n^\perp n^{\perp T}$$

In the equation (4), v indicates an approximation value of u, and each of α1, α2, β, and γ indicates a constant value. Further, n indicates a vector which is perpendicular to a slope of luminance in the acquired original image. In the equation (4), it is acceptable the values u and v are different from each other when a point has a large vertical component to the edge of luminance on a pixel in the structural part image. On the other hand, the change of the value v is suppressed when the point does not have a large vertical component to the edge of luminance on the pixel in the structural part image (see FIG. 3B). The operation flow progresses to step S60.

Figure 4:
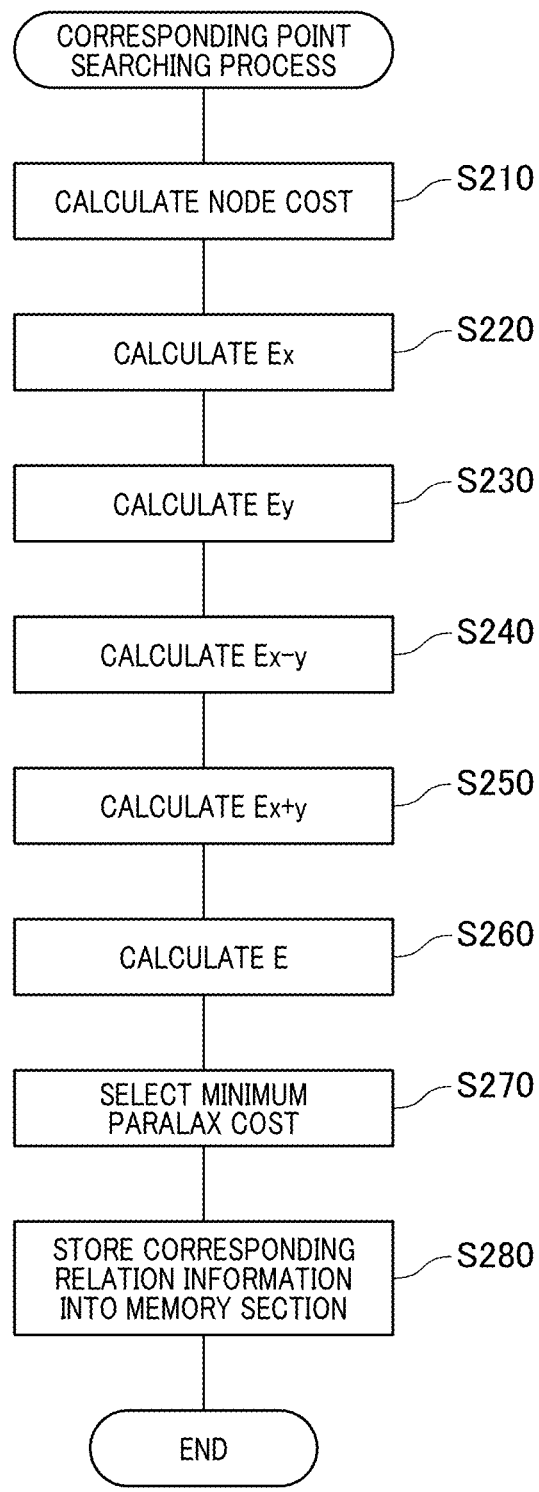
FIG. 4 is a view showing a flow chart of a corresponding point searching process in the distance calculation method shown in FIG. 2 performed by the distance detection device 1.

In step S60, the CPU 11 in the processing section 10 performs the corresponding point searching process shown in FIG. 4. The corresponding point searching process detects a pixel correspondence between the reference image (for example, the acquired original image obtained by the image acquiring section 21) and the comparison image (for example, the acquired original image obtained by the image acquiring section 22). In other words, the corresponding point searching process shown in FIG. 4 detects a correspondence of a location of a same object in the images.

Figure 5A:
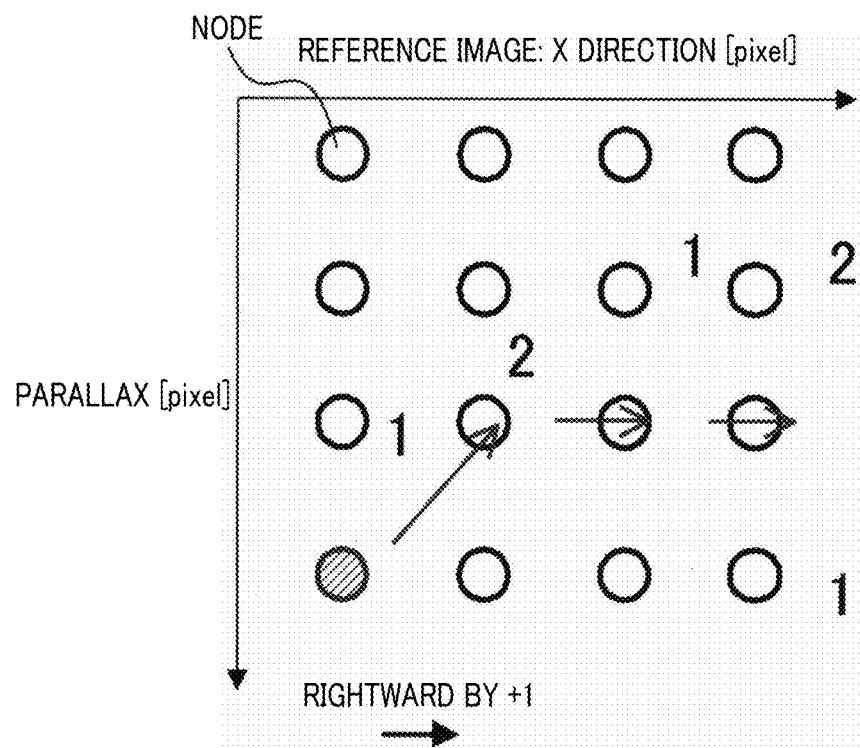
FIG. 5A and FIG. 5B are views schematically explaining a cost calculation in a right direction and a left direction in the distance calculation method shown in FIG. 2.
Figure 5B:
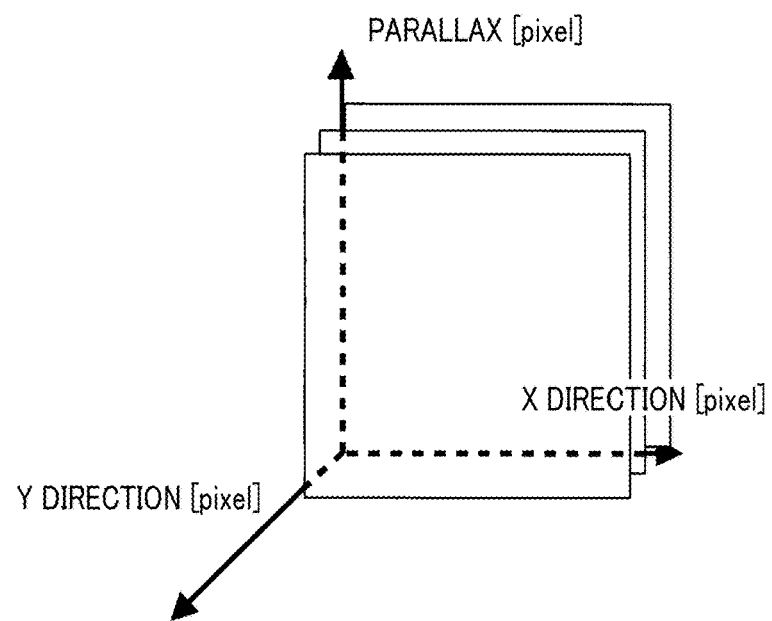

FIG. 4 is a view showing a flow chart of the corresponding point searching process in the distance calculation method shown in FIG. 2. FIG. 5A and FIG. 5B are views schematically explaining a cost calculation in a right direction and a left direction in the distance calculation process shown in FIG. 2.

The CPU 11 calculates a cost of each node in step S210 shown in FIG. 4. The node indicates each pixel which forms a matrix shown in FIG. 5A. Each element in the matrix indicates a relationship between a pixel position in the reference image and a parallax. As shown in FIG. 5A, the vertical axis indicates a pixel location in the reference image, and the horizontal axis indicates a parallax in location between the pixel in the reference image and the pixel in the comparison image.

The CPU 11 performs the corresponding point searching process of calculating a cost of a pixel within a range of parallax searching in the comparison image every a pixel in the reference image. The CPU 11 performs the corresponding point searching process independently from, i.e. the corresponding point searching process is different from the process using the optical flow previously described.

The cost of a node is designated by using D (p, up) where p indicates the location of the pixel, and up indicates the parallax. The cost D (p, up) of the node can be expressed by using the following SSIM (Structural similarity):

$$SSIM(x, y) = [l(x, y)]^\alpha [c(x, y)]^\beta [s(x, y)]^\gamma \quad (11)$$

$$l(x, y) = \frac{2\mu_x \mu_y + C_1}{\mu_x^2 + \mu_y^2 + C_1}, \text{ measure the luminance difference}$$

-continued $$c(x, y) = \frac{2\sigma_x\sigma_y + C_2}{\sigma_x^2 + \sigma_y^2 + C_2}, \text{ measure the contrast difference}$$

$$s(x, y) = \frac{\sigma_{xy} + C_3}{\sigma_x\sigma_y + C_3}, \text{ measure the structure difference}$$

FIG. 6 is a view schematically explaining the process of the SSIM (structural similarity). That is, FIG. 6 shows the definition of each of the parameters $\mu_x$, $\mu_y$, $\sigma_x$, $\sigma_y$, and $\sigma_{xy}$ in the equation (11). In the equation (11), the parameters $\alpha$, $\beta$ and $\gamma$ are optional values, respectively. The operation flow progresses to step S220. The CPU 11 calculates the cost of each of the nodes on the basis of the Viterbi algorithm in step S220 to step S260.

In step S220, the CPU 11 calculates the cost Ex by performing the procedure 1-1.
[Procedure 1-1]

The CPU 11 firstly selects the pixel located at the upper left side in the uppermost row in the reference image, and then selects the pixels in order toward the right direction. When selecting the pixel located at the most right side in the uppermost row in the reference image, the CPU 11 selects the pixel located at the upper left side in the next row toward the bottom side of the matrix. The CPU 11 selects the pixels in order toward the right direction in the reference image. The CPU 11 repeatedly selects the pixels in order in the reference image as the matrix shown in FIG. 5A.

The CPU 11 sequentially selects the pixels in the comparison image, which is present at the same height (at the location in the vertical direction) of the reference image, and the pixel in the comparison image corresponds to the pixel currently selected in the reference image. That is, as shown in FIG. 5B, the CPU 11 shifts the coordinate of the pixel selected in the horizontal direction (X direction) in the reference image and the comparison image.

The CPU 11 uses a predetermined function to calculate a parallax cost S (up, uq) so that the parallax cost S increases due to increasing of the parallax (a pixel location difference between the reference image and the comparison image). That is, the term S (up, uq) indicates the parallax cost when the parallax is changed from p to q.
[Procedure 1-2]

The CPU 11 applies the Viterbi algorithm to the node cost D (p, up) and the parallax cost S (up, uq).

$$\text{Viterbi:} \quad (12)$$

$$E(u_p) = \sum_p D(p, u_p) + \sum_{(p,q)\in\varepsilon} S(u_p, u_q)$$

$$= \sum_p D(p, u_p) + \sum_{(p,q)\in\varepsilon} |u_p - u_q|$$

$$= \sum_p D(p, u_p) + \sum |\nabla u|$$

As shown in FIG. 5A, the equation (6) previously described shows a sum E (up) of the original node cost D (p, up) and the parallax cost S (up, uq) of a node at the left side to another node in the matrix.

The CPU 11 uses the Viterbi algorithm to calculate a combination of the node cost and the parallax cost when the sum E (up) has the minimum value for each node. The obtained combination data is a right side cost.

[Procedure 1-3]
The CPU 11 performs the method for the procedure 1-1 and the procedure 1-2 previously described along the direction from the right side to the left side (in the left direction) in order to calculate the cost of the Viterbi algorithm, i.e. a left direction cost.
[Procedure 1-4]

The CPU 11 adds the right direction cost and the left direction cost for each node, and stores the sum of this addition as a right and left direction cost Ex into the memory section 12. The operation flow progresses to step S230.

In step S230, the CPU 11 performs the following procedure 2-1 to calculate a cost Ey.
[Procedure 2-1]

Figure 7A:
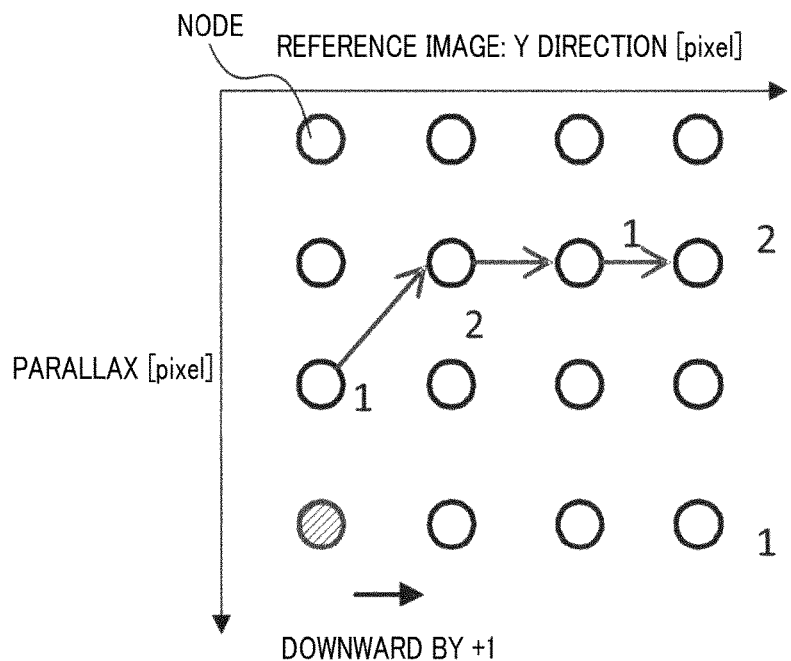
FIG. 7A and FIG. 7B are views schematically explaining a cost calculation in an upward direction and a downward direction (i.e. a vertical direction) in the distance calculation method shown in FIG. 2.
Figure 7B:
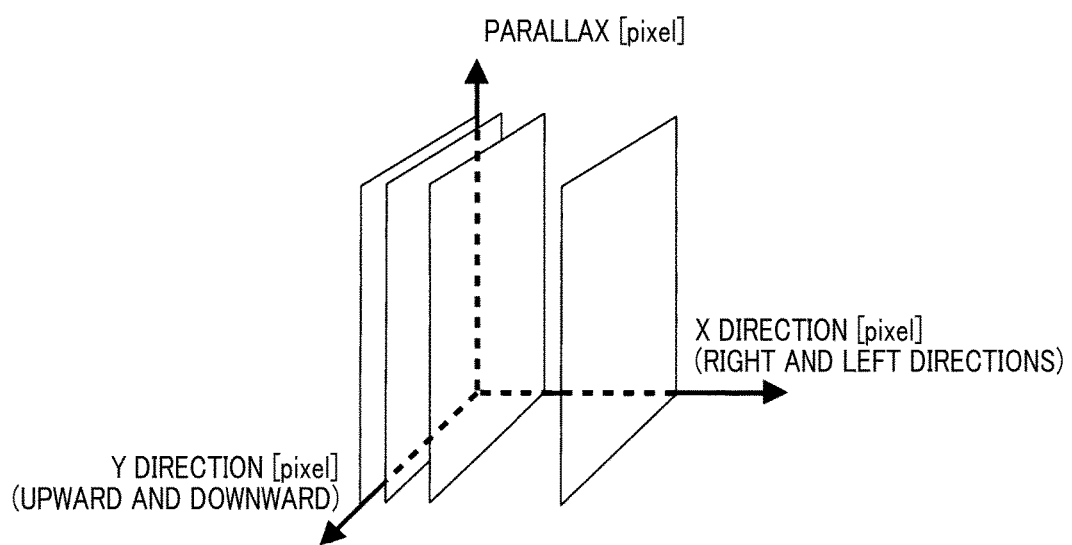

FIG. 7A and FIG. 7B are views which schematically explain a cost calculation in an upward direction and a downward direction in the distance calculation process shown in FIG. 2. As shown in FIG. 7B, the CPU 11 prepares a virtual plane when viewed from the Y direction (in the vertical direction on the image) for each node. The CPU 11 selects the pixel corresponding to the virtual plane. That is, the CPU 11 selects the pixel located at the upper left side and the pixels in order to the downward direction in order in the reference image. When selecting the pixel located at the most lower side, the CPU 11 selects the pixel at the upper side shifted by one toward the right direction, and pixels in the image along the downward direction. At the same time, the CPU 11 sequentially selects the pixels in the comparison image, which are located at the same left right direction of the pixels selected in the reference image, from the upper side to the bottom side (in the downward direction).

The CPU 11 calculates the parallax cost S (up, uq) of this case.
[Procedure 2-2]

The CPU 11 applies the Viterbi algorithm to the node cost D (p, up) and the parallax cost S (up, uq) which have been calculated.

As shown in FIG. 7A, the CPU 11 obtains a combination of the node cost and the parallax cost so as to have the minimum value of E (up) for each node on the basis of using the Viterbi algorithm previously described. That is, this calculation provides the downward direction cost.
[Procedure 2-3]

The CPU 11 applies the same methods disclosed in the procedure 2-1 and the procedure 2-2 to the direction from the bottom to the upper side in order to calculate the cost of the Viterbi algorithm. That is, this calculation provides the upward direction cost.
[Procedure 2-4]

The CPU 11 adds the downward direction cost and the upward direction cost for each corresponding node, and the result of the addition is stored as the vertical direction cost Ey into the memory section 12. The operation flow progresses to step S240.

In step S240 shown in FIG. 4, the CPU 11 performs the following procedure 3-1 to calculate the cost Ex–y.
[Procedure 3-1]

Figure 8A:
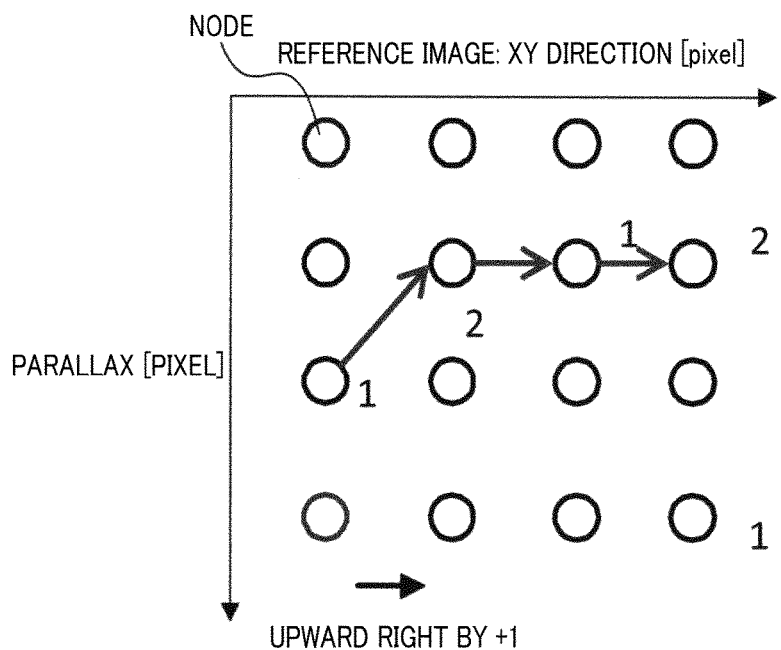
FIG. 8A and FIG. 8B are views schematically explaining a cost calculation in an oblique direction performed in the distance calculation method shown in FIG. 2.
Figure 8B:
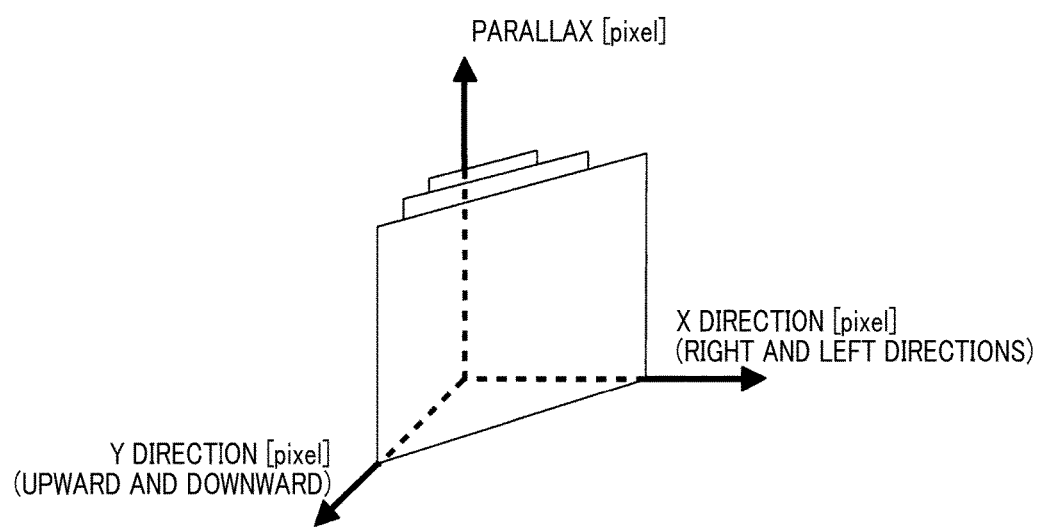

FIG. 8A and FIG. 8B are views schematically explaining the cost calculation in an oblique direction performed in the distance calculation method shown in FIG. 2. As shown in FIG. 8B, the CPU 11 prepares a virtual plane for each node when viewed in the X-Y direction (in the 45 degree oblique line from the bottom left to the upper right in the image). The CPU 11 selects the pixels which correspond to the prepared virtual plane. That is, the CPU 11 in the processing section 10 selects the pixel at the upper left in the reference image, and then selects the pixel at the 45 degree upper right in the reference image.

After has selected the pixel located at the right end, the CPU 11 selects the pixel at the uppermost side in the left side column, and then selects the pixel at the 45 degree upper right in the reference image, and repeatedly selects the pixels by the same procedure previously described. In the comparison image, the CPU 11 sequentially selects the pixels located at the 45 degree oblique line, which correspond to the pixels selected in the reference image. The CPU 11 repeatedly performs the selection previously described from the bottom left side to the upper right side in the comparison image.

The CPU 11 calculates the parallax cost S (up, uq) of this case.

[Procedure 3-2]

The CPU 11 applies the Viterbi algorithm for the node cost D (p, up) and the parallax cost S (up, uq) which have been calculated.

As shown in FIG. 8A, the CPU 11 obtains a combination of the node cost and the parallax cost so as to obtain the minimum value of E (up) for each node on the basis of using the Viterbi algorithm previously described. That is, this calculation provides the upward right oblique direction cost.

[Procedure 3-3]

The CPU 11 applies the same methods disclosed in the procedure 3-1 and the procedure 3-2 to the direction from the upper right to the left oblique direction in order to calculate the cost of the Viterbi algorithm. That is, this calculation provides the downward right oblique direction cost.

[Procedure 3-4]

The CPU 11 adds the downward right oblique direction cost and the upward right oblique direction cost for each corresponding node, and the results of the addition are stored as the right oblique cost Ex−y into the memory section 12. The operation flow progresses to step S250.

[Procedure 4]

In step S250 shown in FIG. 4, the CPU 11 performs the following procedure 4 to calculate a cost Ex+y. Similar to the procedures 3-1 to 3-4, the CPU 11 calculates the left oblique direction cost, and stores the calculation results into the memory section 12.

In each step in the procedures previously described, the CPU 11 calculates the cost E (p, u), (Ex, Ey, Ex−y, Ex+y) of the Viterbi algorithm by using the following equation (13).

$$E(p,u)=\min_{v=0,\ldots,u}\{E(p-1,v)+s(u,v)\}+D(p,u) \quad (13)$$

where, E (p, u) indicates the cost of the Viterbi algorithm, p designates a pixel position, u indicates a parallax between the pixel position p and the pixel position p−1, s (u, v) indicates the cost when the parallax is changed from v to u when the pixel position is shifted from p−1 to p, and D (p, u) indicates the cost of the node when the pixel position is p and the parallax is u.

Figure 9:
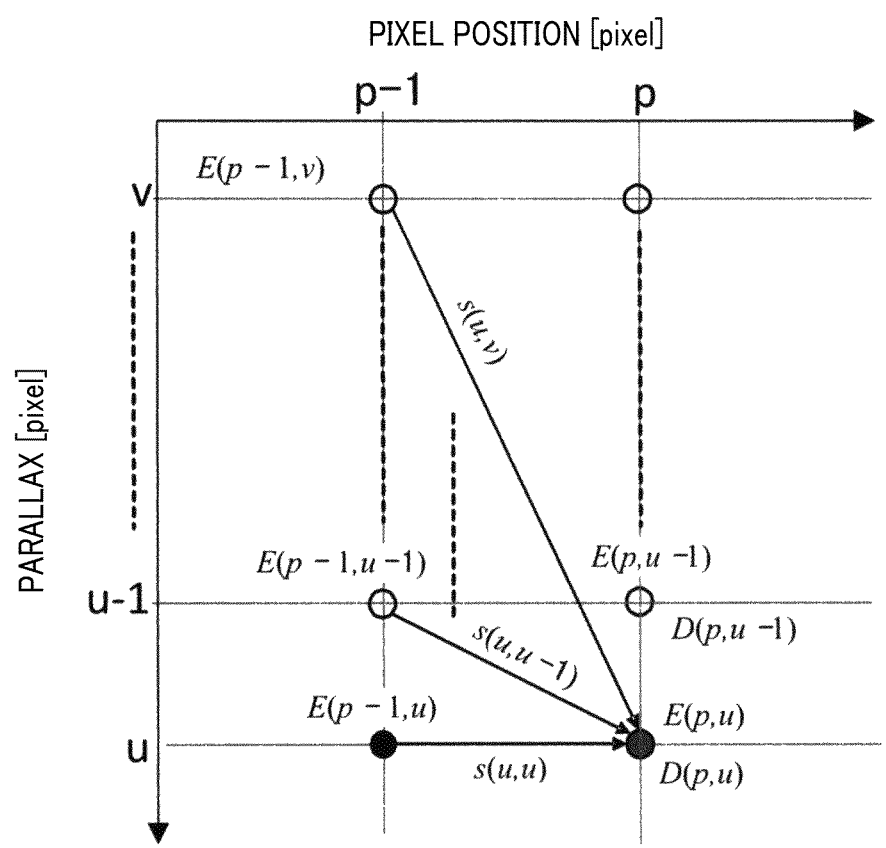
FIG. 9 is a view schematically explaining a cost calculation of the Viterbi algorithm when the pixel position p−1 is shifted to the pixel position p in the direction from the left to the right performed in the distance calculation method shown in FIG. 2.

FIG. 9 is a view schematically explaining the cost calculation of the Viterbi algorithm when the pixel position p−1 is shifted to the pixel position p in the direction from the left to the right performed in the distance calculation method shown in FIG. 2.

In the example shown in FIG. 9, the CPU 11 calculates the cost of the Viterbi algorithm from the pixel position p−1 to the pixel position p along the right direction from the left side. The cost of the Viterbi algorithm when the pixel position is p and the parallax is u becomes a value obtained by adding the minimum value {Ep−1, v}+s (u, v)} and the current node D (p, u).

It is necessary for the CPU 11 to perform m×n times searching operation when m indicates an allowable parallax range, and n indicates the number of the searching ranges (i.e. the number of arrow lines shown in FIG. 9). The operation flow progresses to step S260.

However, the CPU 11 in the processing section 10 according to the exemplary embodiment obtains the value E (p, u) by using the following equation (14) in step S260 shown in FIG. 4.

$$E(p,u)=\min\{(E(p,u-1)-D(p,u-1)+1),(E(p-1,u)+s(u,u))\}+D(p,u) \quad (14)$$

The CPU 11 calculates the optimum solution of the equation (14) by using the cost when the parallax is (u−1) and the pixel position is p, the cost when the parallax is (u) and the pixel position is (p−1), and the node cost is Zd (p, u).

The CPU 11 uses the equation (14) instead of using the equation (13) because the equation (13) and the equation (14) are equivalent to each other. The reason why is as follows:

$$E(p,u)=\min_{v=0,\ldots,u-1}\{(E(p-1,v)+s(u,v)),(E(p-1,u)+s(u,u))\}+D(p,u) \quad (15)$$

$$E(p,u-1)=\min_{v=0,\ldots,u-1}\{E(p-1,v)+s(u-1,v)\}+D(p,u-1) \quad (16)$$

In the equation (15), $\min_{v=0,\ldots,c,(u-1)}$ in E (p, u) is equivalent to $\min_{v=u}$. Further, the equation (16) is equal to the equation (13) when u is replaced with (u−1).

$$E(p,u-1)-D(p,u-1)=\min_{v=0,\ldots,u-1}\{E(p-1,v)+s(u-1,v)\} \quad (17)$$

The equation (17) is obtained by shifting D (p, u−1) at the right side to the left side in the equation (16). Further, the following equation (18) can be obtained when adding −s (u−1, v)+s (u, v) to both sides of the equation (17).

$$E(p,u-1)-D(p,u-1)+s(u,v)-s(u-1,v)=\min_{v=0,\ldots,u-1}\{E(p-1,v)+s(u,v)\} \quad (18)$$

When the left side in the equation (18) is replaced with min {E (p−1, v)+s (u, v)} at the right side in the equation (15), E (p, u) can be expressed by the equation (14). That is, it is possible for the CPU 11 to obtain tE (p, u) by adding the comparison calculation of the two terms (in min part) and the node cost D.

The calculation and equations previously described uses the relationship of s (u, v)=u−v. The cost E (p, u) is obtained by using the equation (14) instead of using the equation (13), it is possible for the CPU 11 to perform the searching process 2m times instead of using m×n times. This makes it possible to provide the searching calculation at a high speed. The operation flow progresses to step S270.

In step S270 shown in FIG. 4, the CPU 11 selects the parallax having the minimum value on the basis of the cost E (p, u). The operation flow progresses to step S280.

In step S280, the CPU 11 stores the corresponding relation information in each pixel between the reference image and the comparison image. The CPU 11 completes the corresponding point searching process shown in FIG. 4.

After the completion of the corresponding point searching process shown in FIG. 4, the operation flow returns to step S70 shown in FIG. 2. In step S70, the CPU 11 performs the parallax integration process.

FIG. 10 is a flow chart showing the parallax integration process in the distance calculation process shown in FIG. 2. The parallax integration process shown in FIG. 10 judges which one of the parallax estimation results obtained by the Viterbi algorithm or the parallax estimation results obtained by the optical flow to select.

In the parallax integration process shown in FIG. 10, the CPU 11 judges the presence of an occlusion region in step S410. Such an occlusion region indicates a region with a low reliability of the parallax estimation result obtained by the Viterbi algorithm. For example, the occlusion region indicates the region having a relative large cost E (p, u) of being not less than a judgment threshold value. The CPU 11 divides an image into a plurality of divided regions, and performs whether or not each divided region is the occlusion region. That is, it is acceptable for each divided region to be composed of one pixel or a plurality of pixels.

It is possible for the CPU 11 to perform, as the judgment of the occlusion region, the method disclosed by Peter Sand, etc. "Particle Video: Long-Range Motion Estimation using Point Trajectories". The operation flow progresses to step S420.

In step S420, the CPU 11 applies the parallax estimation result obtained by the Viterbi algorithm to all of the pixels (i.e. all of the divided regions). The operation flow progresses to step S430.

In step S430, the CPU 11 detects whether or not the occlusion region is present in each of the divided regions. When the judgment result in step S430 indicates negation ("NO" in step S430), i.e. there is no occlusion region in the divided regions, the CPU 11 completes the parallax integration process shown in FIG. 10, and the operation flow progresses to step S80 shown in FIG. 2.

When the detection result in step S403 indicates affirmation ("YES" in step S430), i.e. a divided region has the occlusion region, the operation flow progresses to step S440.

In step S440, the CPU 11 applies the parallax estimation result obtained by the optical flow to this divided region containing the occlusion region. That is, the CPU 11 uses the parallax estimation results obtained by the optical flow for the divided region containing the occlusion region instead of using the parallax estimation results obtained by the Viterbi algorithm. After this step, the CPU 11 completes the parallax integration process shown in FIG. 10.

After the completion of the parallax integration process shown in FIG. 10, the operation flow progresses to step S80 shown in FIG. 2.

In step S80, the CPU 11 detects whether or not there is an outlier in the parallax of each pixel. For example, the CPU 11 determines that the parallax of a detection pixel is an outlier when the parallax of the detection pixel is greatly separated from the parallax of each pixel located around the detection pixel. For example, the CPU 11 uses, as the outlier detection process, a known method disclosed by "Secrets of Optical Flow Estimation and Their Principles".

When the detection result in step S80 indicates affirmation ("YES" in step S80), i.e. the CPU 11 detects that the parallax of the pixel is an outlier, the operation flow progresses to step S90. In step S90, the CPU 11 eliminates this pixel as the outlier. The operation flow returns to step S30.

On the other hand, when the detection result in step S80 indicates negation ("NO" in step S80), i.e. the CPU 11 does not detect any outlier, the operation flow progresses to step S100.

In step S100, the CPU 11 performs the smoothing process. For example, the CPU 11 uses a known method disclosed by D, Ferstl, et al. "Image Guided Depth Upsampling using anisotropic total generalized variation"

That is, as shown in the following equation (22), the CPU 11 replaces Ds in the following equation (21) with parallax information levels_u obtained in each resolution.

(Known Method)

$$\min_{u,\chi}\left\{\alpha_1 \int \left|T^{\frac{1}{2}}(\nabla u - \chi)\right| dx + \alpha_0 \int |\nabla \chi| dx + + \int w|(u - D_S)|^2 dx\right\}. \quad (21)$$

(Proposed Method)

$$\min_{u,\chi}\left\{\alpha_1 \int \left|T^{\frac{1}{2}}(\nabla u - \chi)\right| dx + \alpha_0 \int |\nabla \chi| dx + + \int w|(u - {}^{levels}u)|^2 dx\right\}. \quad (22)$$

The parallax information "$^{levels}u$" represents an estimated parallax in the previous images with a pyramid hierarchical structure (which is an acquired image with a lower resolution). The CPU 11 performs the smoothing process by using the equation (22), and provides a smoothed road surface and sharped edges. The operation flow progresses to step S110.

In step S110, the CPU 11 calculates a distance to the object on each pixel according to the parallax of the corresponding point of each pixel. The operation flow progresses to step S120. In step S120, the CPU 11 outputs the corresponding data between each pixel and its distance to the vehicle control section 30. The CPU 11 completes the distance calculation process shown in FIG. 2.

The corresponding data obtained by the distance calculation process indicates the distance image having a relationship between each pixel and its distance. In the distance image, the distance of each pixel is expressed by darkness, i.e. a shade degree. The more the darkness as the shade degree becomes high, the more the pixel has a far distance.

Figure 11A:
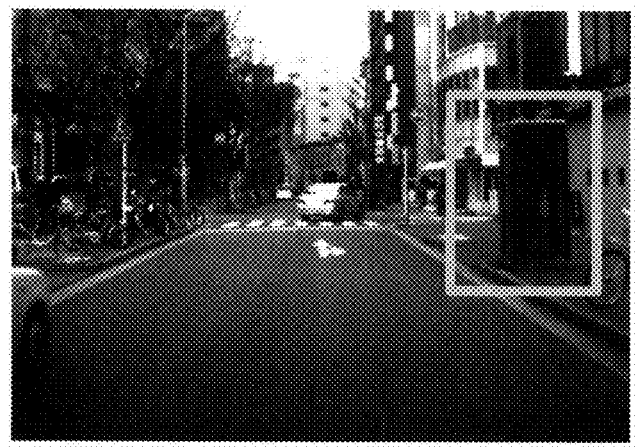
FIG. 11A to FIG. 11C are views showing an example of distance images obtained by the distance detection device 1 according to the exemplary embodiment of the present invention.
Figure 11B:
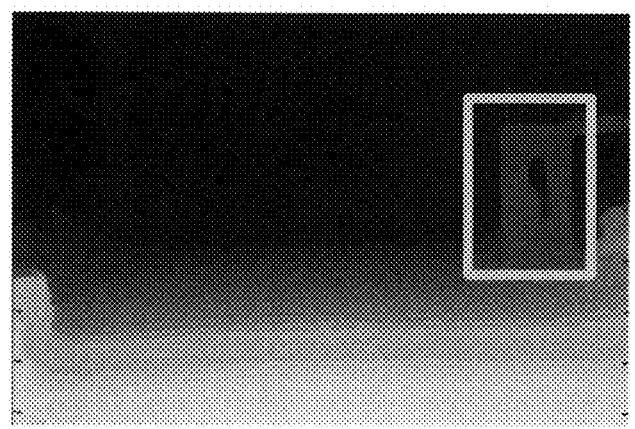
Figure 11C:
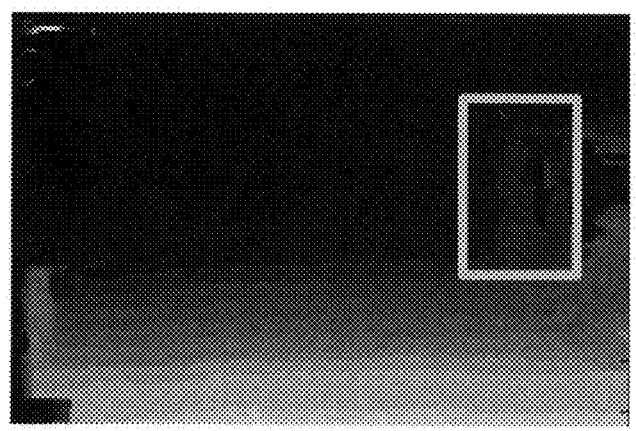

FIG. 11A to FIG. 11C are views, each showing an example of distance image obtained by the distance detection device according to the exemplary embodiment. FIG. 11A shows an acquired image obtained by the image acquiring sections 21 and 22. FIG. 11B shows a distance image obtained by the corresponding searching process performed by the distance detection device 1 according to the exemplary embodiment previously described. FIG. 11C shows a distance image obtained by performing the Viterbi algorithm only.

In the distance image shown in FIG. 11C obtained by using the Viterbi algorithm only, a region of a telephone box and its surrounding area includes an occlusion region and has a blurry outline indicated by the white frame. On the other hand, the corresponding searching process performed by the distance detection device 1 according to the exemplary embodiment provides the sharper distance image around the telephone box shown in FIG. 1B. The distance detection device 1 and the corresponding point searching method according to the exemplary embodiment provides the distance image having a sharper e telephone box region and its surrounding area. It can be understand that the distance image shown in FIG. 1B has relatively-improved distance estimation accuracy.

[Effects]

The CPU 11 in the processing section 10 of the distance detection device 1 according to the exemplary embodiment performs the following steps: a first searching step, a second searching step, a search accuracy judgment step and a corresponding point setting step.

In the first searching step, the CPU 11 searches or finds for corresponding points between pixels in images every pixels in reference image by using the predetermined first method (step S50).

In the second searching step, the CPU 11 performs the second searching step of searching or finding for corresponding points between pixels in the images every pixels in the reference image by using the predetermined second method, which is different from the predetermined first method (step S60).

In the search accuracy judgment step, the CPU 11 judges whether or not a search accuracy of the corresponding points obtained by the predetermined first method is not less than the reference value for each divided region in the reference image (step S70, step S430).

In the corresponding point setting step, the CPU 11 uses the corresponding points in the divided region obtained by the predetermined first method when the search accuracy of the corresponding points in the divided region is not less than the reference value. On the other hand, the CPU 11 uses the corresponding points in the divided region obtained by the predetermined second method when the search accuracy of the corresponding points in the divided region is less than the reference value (step S420, step S440).

In the corresponding point searching method according to the present invention, the CPU 11 in the processing section 10 of the distance detection device 1 searches or finds for corresponding points in the acquired images by using a plurality of searching methods such as the predetermined first method and the predetermined second method. When the search accuracy of the corresponding points in the divided region obtained by the predetermined first method is not less than the reference value, the CPU 11 uses the corresponding points obtained by this method. On the other hand, when the search accuracy of the corresponding points is less than the reference value, the CPU 11 uses the corresponding points obtained by the predetermined second method.

As previously described, it is possible for the distance detection device 1 to use the corresponding points in images obtained by another method when the search accuracy of the corresponding points obtained by one method is low. This makes it possible to improve the search accuracy of the corresponding points in images.

The distance detection device 1 uses the predetermined first method so that a difference in search accuracy of the corresponding points between the divided regions becomes relatively high.

On the other hand, the distance detection device 1 uses the predetermined second method so that a difference in search accuracy of the corresponding points between the divided regions becomes relatively low.

Accordingly, it is sufficient for the distance detection device 1 to use the predetermined second method when the search accuracy of the corresponding points obtained by the predetermined first method is low.

The processing section 10 in the distance detection device 1 uses, as the corresponding points between images, corresponding points obtained by using the predetermined first method such as the Viterbi algorithm. The processing section 10, i.e. the CPU 11 in the processing section 10 replaces the corresponding points in the divided region obtained by the predetermined first method with the corresponding points in the divided region obtained by the predetermined second method when the search accuracy of the corresponding points in the divided region is less than the predetermined reference value.

Because the distance detection device 1 having the structure and behavior previously described replaces the corresponding points in the divided region with a low search accuracy with the corresponding points obtained by the predetermined second method, it is possible to avoid the execution of the process of replacing the corresponding points when the search accuracy is relatively high. This makes it possible to reduce the overall processing load of the distance detection device 1.

In addition, the processing section 10 in the distance detection device 1 calculates the pixel cost for each pixel in the reference image on the basis of a difference between image information in the reference image in a plurality of images and the pixel information in the comparison image other than the reference image in the plurality of the images while exchanging the reference pixel and the comparison pixel (step S210). When the reference pixel is changed, the processing section 10 calculates the parallax cost for each reference pixel. The parallax cost represents the cost corresponding to a change amount of the parallax which is a difference in coordinate between the reference pixel and the comparison pixel. The processing section 10 calculates a combination of each reference pixel and the comparison pixel when the overall cost of the pixel cost and the parallax cost becomes the minimum value (step S220 to step S260). The processing section 10 calculates the minimum cost when the calculated overall cost has the minimum value while exchanging the reference pixel and the comparison pixel are changed in a plurality of directions. The minimum costs calculated in the plural directions are added together or convoluted for each direction to obtain the minimum value. Further, the processing section 10 selects, as a corresponding point candidate, the comparison pixel corresponding to each reference pixel (step S270).

That is, the distance detection device 1 uses the multi-path Viterbi in which the Viterbi algorithm is applied to a plurality of directions in the first searching step. The distance detection device 1 having the structure previously described can search or find for corresponding points in the regions with high accuracy to which the Viterbi algorithm is applied.

Still further, the processing section 10 in the distance detection device 1 having the structure previously described uses the optical flow to extract a pixel corresponding to a pixel in the reference image as a corresponding point candidate. Accordingly, the distance detection device 1 can search or find for the corresponding points with certain accuracy through the overall regions of the images by using the optical flow.

When the search accuracy obtained by the predetermined first method, i.e. the Viterbi algorithm is lower than the search accuracy obtained by the predetermined second method, i.e. the optical flow, the distance detection device 1 uses the corresponding points obtained by the optical flow. This makes it possible to improve the search accuracy of the corresponding points.

The processing section 10 in the distance detection device 1 detects a distance to an object on the basis of the position relation between the pixels (step S110). The structure of the distance detection device 1 makes it possible to increase the search accuracy of the corresponding points by using the corresponding searching methods previously described, and detect the correct distance to the object with high accuracy.

[Other Modifications]

The concept of the present invention is not limited by the exemplary embodiment previously explained. It is possible to combine the components and behavior of the distance detection device 1.

The concept of the distance detection device 1, the distance detection and the corresponding searching method according to the present invention can be realized by using various modifications, a system equipped with the distance detection device 1, a program capable of realizing the functions of the distance detection method, and the corresponding point searching method, a computer-readable medium for storing the programs, etc.

As previously described, the distance detection device 1 according to the exemplary embodiment performs the various steps such as the parallax estimation for images with a pyramid hierarchical structure and divided region images by using the optical flow. However, the concept of the present invention is not limited by this. For example, it is possible for the distance detection device 1 to perform these steps for a part of the images with a pyramid hierarchical structure and the divided region images. It is also possible to change the images for each step.

[Correspondence Relationship]

The processing section 10 according to the exemplary embodiment corresponds to an image processing device. The step S1- to step S100 according to the exemplary embodiment performed by the processing section 10 correspond to the corresponding point searching method and an image corresponding section.

The step S50 according to the exemplary embodiment corresponds to the first searching step, the step S60 according to the exemplary embodiment corresponds to the second searching step. The step S210 according to the exemplary embodiment corresponds to the pixel cost calculation step. The step S220 to step S260 according to the exemplary embodiment correspond to the minimum cost pixel calculation step.

The step S270 according to the exemplary embodiment correspond to the measurement section. The step S430 according to the exemplary embodiment correspond to the search accuracy judgment step.

The steps S420 and S440 according to the exemplary embodiment correspond to the corresponding point setting step.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A corresponding point searching method for searching for corresponding points between plural images, performed by an image processing device capable of performing an image processing on the plural images having a parallax therebetween, the method comprising:
   a first searching step of performing a predetermined first method for searching for corresponding points between the plural images for each pixel in a reference image in the plural images;
   a second searching step of performing a predetermined second method for searching the corresponding points between the plural images for each pixel in the reference image in the plural images, the predetermined second method being different from the predetermined first method;
   a search accuracy judgment step of detecting whether or not search accuracy of the corresponding points obtained by the predetermined first method is not less than a reference value; and
   a corresponding point setting step of selecting the corresponding points obtained by the predetermined first method when the search accuracy of the corresponding points obtained by the predetermined first method is not less than the reference value, and selecting the corresponding points obtained by the predetermined second method when the search accuracy of corresponding points obtained by the predetermined first method is less than the reference value,
   wherein the first searching step comprises:
      a pixel cost calculation step calculating a pixel cost for each reference pixel in the reference image on a basis of a difference between reference pixel information representing reference pixels in the reference image and comparison pixel information representing comparison pixels in the reference image while exchanging the reference pixel and the comparison pixels, where the comparison image is selected from the plural images other than the reference image;
      a minimum cost pixel calculation step calculating a parallax cost for each pixels, where the parallax cost represents a parallax change amount as a coordinate difference between the reference pixel and the comparison pixel when the reference pixel is changed, and calculates a combination of the reference pixel and the comparison pixel with a total minimum cost of the pixel cost and the parallax cost; and
      a corresponding reference point extraction step extracting the comparison pixel as a corresponding pixel candidate which corresponds to the reference pixel for each reference pixel, and
   wherein the minimum cost pixel calculation step calculates a minimum cost when the reference pixels and the comparison pixels are changed in each of plural directions, and calculates the total minimum cost by adding the minimum costs obtained in the plural directions together.

2. The corresponding point searching method according to claim 1, wherein the corresponding point setting step firstly sets the corresponding points between the images obtained by the predetermined first method, and replaces the corresponding points in a region having search accuracy of less than the reference value with the corresponding points in the region obtained by the predetermined second method.

3. The corresponding point searching method according to claim 1, wherein the second searching step extracts the corresponding pixel candidate in the comparison images which corresponds to each pixel in the reference image by using an optical flow.

4. The corresponding point searching method according to claim 2, wherein the second searching step extracts the corresponding pixel candidate in the comparison images which corresponds to each pixel in the reference image by using an optical flow.

5. A distance detection device capable of detecting a distance to an object by using plural acquired images having a parallax, comprising:
   a pixel corresponding point section obtaining a correspondence in location between pixels in the plural acquired images on the basis of the corresponding point searching method according to claim 1; and
   a detection section detecting a distance to an object on the basis of the correspondence in location between pixels in the plural acquired images.

6. A distance detection device capable of detecting a distance to an object by using plural acquired images having a parallax, comprising:

a pixel corresponding point section obtaining a correspondence in location between pixels in the plural acquired images on the basis of the corresponding point searching method according to claim 2; and a detection section detecting a distance to an object on the basis of the correspondence in location between pixels in the plural acquired images.

* * * * *

UNITED STATES PATENT AND TRADEMARK OFFICE
CERTIFICATE OF CORRECTION

| | | |
|---|---|---|
| PATENT NO. | : 10,043,106 B2 | Page 1 of 1 |
| APPLICATION NO. | : 15/171606 | |
| DATED | : August 7, 2018 | |
| INVENTOR(S) | : Kazuhisa Ishimaru et al. | |

It is certified that error appears in the above-identified patent and that said Letters Patent is hereby corrected as shown below:

In Column 5, Line 58, change "html) In" to --html). In--

In Column 11, Line 64, change "variation'" to --variation".--

In Column 16, Claim 1, Line 21, change "each pixels," to --each pixel,--

Signed and Sealed this
Thirteenth Day of November, 2018

Andrei Iancu
*Director of the United States Patent and Trademark Office*